US012728061B2

(12) United States Patent
Cho et al.

(10) Patent No.: US 12,728,061 B2
(45) Date of Patent: Sep. 8, 2026

(54) SPINAL TRACTION ALGORITHM AND THERMAL SPINAL MASSAGE DEVICE TO WHICH SAME IS APPLIED

(71) Applicant: CERAGEM CO., LTD., Cheonan-si (KR)

(72) Inventors: Il Young Cho, Jeonju-si (KR); Ka Eun Kim, Cheonan-si (KR); Hong Young Jang, Cheonan-si (KR); Mi Hyun Lee, Yongin-si (KR)

(73) Assignee: CERAGEM CO., LTD., Cheonan-si (KR)

( * ) Notice: Subject to any disclaimer, the term of this patent is extended or adjusted under 35 U.S.C. 154(b) by 189 days.

(21) Appl. No.: 18/553,372

(22) PCT Filed: Apr. 1, 2022

(86) PCT No.: PCT/KR2022/004682
§ 371 (c)(1),
(2) Date: Sep. 29, 2023

(87) PCT Pub. No.: WO2022/211564
PCT Pub. Date: Oct. 6, 2022

(65) Prior Publication Data

US 2024/0189173 A1 Jun. 13, 2024

(30) Foreign Application Priority Data

Apr. 1, 2021 (KR) ........................ 10-2021-0042714

(51) Int. Cl.
*A61H 1/02* (2006.01)

(52) U.S. Cl.
CPC ... *A61H 1/0218* (2013.01); *A61H 2201/0207* (2013.01); *A61H 2201/1609* (2013.01);
(Continued)

(58) Field of Classification Search
CPC .......... A61F 5/0193; A61F 5/32; A61F 5/028; A61F 5/02; A61F 5/022; A61F 5/024;
(Continued)

(56) References Cited

FOREIGN PATENT DOCUMENTS

JP 2012-514487 A 6/2012
JP 2020-501728 A 1/2020
(Continued)

OTHER PUBLICATIONS

Office Action received in Japanese Patent Application No. 2023-560619 dated Jul. 23, 2024.
(Continued)

*Primary Examiner* — Ophelia A Hawthorne
(74) *Attorney, Agent, or Firm* — Knobbe, Martens, Olson & Bear, LLP

(57) ABSTRACT

A spinal traction algorithm and a thermal spinal massage device to which the same is applied are disclosed. A spinal traction method applied to a thermal spinal massage device, according to one embodiment, allows a ceramic to travel along a spinal column on the basis of a spinal traction algorithm in order to deliver physical force to the spine, and generate force in at least two directions to help lordotic curve controlled traction (LCCT), wherein the spinal traction algorithm can generate a longitudinal tractive force as the ceramic horizontally travels while being in close contact with the spine in the axial direction along the spinal column and pulls the spine, and maintain a curve and generate a longitudinal tractive force as the ceramic rises from the posterior to the anterior.

17 Claims, 12 Drawing Sheets

(52) U.S. Cl.
CPC ................ *A61H 2201/1623* (2013.01); *A61H 2201/1669* (2013.01); *A61H 2201/50* (2013.01)

(58) Field of Classification Search
CPC ... A61F 5/026; A61F 5/03; A61H 2201/0207; A61H 2201/1609; A61H 2201/1623; A61H 2201/1669; A61H 2201/50; A61H 2201/10; A61H 2201/1207; A61H 2201/1664; A61H 1/0222; A61H 1/0292; A61H 1/0296; A61H 1/02
See application file for complete search history.

(56) References Cited

FOREIGN PATENT DOCUMENTS

| | | | | |
|---|---|---|---|---|
| KR | 10-2003-0063775 A | 7/2003 | | |
| KR | 10-2013-0044791 A | 5/2013 | | |
| KR | 10-2017-0137349 A | 12/2017 | | |
| KR | 101857555 B1 * | 12/2017 | | ............. A61H 1/008 |
| KR | 10-2018-0091640 A | 8/2018 | | |
| KR | 10-2056545 B1 | 12/2019 | | |
| KR | 10-2020-0004780 A | 1/2020 | | |
| KR | 10-2279549 B1 | 7/2021 | | |

OTHER PUBLICATIONS

International Search Report dated Jul. 19, 2022 in International Application No. PCT/KR2022/004682.
Frobin et al., "Precision measurement of disc height, vertebral height and sagittal plane displacement from lateral radiographic views of the lumbar spine," Clinical Biomechanics, vol. 12, Supplement 1, 1997.
Saunders, "Lumbar traction" The Journal of Orthopedic & Sports Physical Therapy. 1979;1(1):36-45. doi: 10.2519/jospt., 1979.
Office Action received in corresponding Japanese Patent Application No. 2023-560619 dated Nov. 12, 2024.
Extended European Search Report received in corresponding European Patent Application No. 22781683.2 dated Apr. 28, 2025.
Office Action dated Nov. 13, 2025, in corresponding Indian Patent Application No. 202347073933.

* cited by examiner

SPINAL TRACTION ALGORITHM AND THERMAL SPINAL MASSAGE DEVICE TO WHICH SAME IS APPLIED

CROSS-REFERENCE TO RELATED APPLICATION

This application claims priority to and the benefit of Korean Patent Application No. 10-2021-0042714, filed on Apr. 1, 2021, the disclosure of which is incorporated herein by reference in its entirety.

TECHNICAL FIELD

The following embodiments relate to a spinal traction technique, and more specifically to a spinal traction algorithm and a thermal spinal massage device to which the same is applied.

BACKGROUND ART

One of the main functions of the intervertebral discs is to reduce the compressive load during daily activities. Disc damage or degeneration can lead to mechanical compression or chemical stimulation of the nerve roots. Many treatments have been performed in the past to solve the dysfunction and pain of the intervertebral discs. In particular, spinal traction has been used to treat dysfunction and pain of the spine since the time of Hippocrates, and even recently, spinal traction therapy has been applied to the treatment of spinal pain in various ways.

Spinal traction is reported to be helpful in relieving pain by stretching the posterior longitudinal ligament, increasing the intervertebral disc space and generating negative intra-disc pressure, resulting in a disc suction effect and restoration of the posterior longitudinal ligament. In this regard, previous studies have reported that spinal traction increases the diameter of the intervertebral foramen and relieves direct pressure or contact of damaged nerve tissue to reduce pain and normalize neurological deficits, and it has been reported to be effective in alleviating pain by improving the adhesion and stiffness of spinal structures.

Until now, most spinal traction devices used to relieve pain in the spine take an axial traction method by applying a force in the axial direction of the spine. However, this method straightens the spinal structure rather than decompressing the intervertebral disc, which reduces the natural lordotic curve, and as a result, it may cause muscle pain and spasm, and damage to the facet joints and soft tissue structures of the spine, which may cause the side effects of traction therapy.

In this regard, when positional traction that vertically tracts the vertebral structure to a specific area while maintaining the lordotic curve is additionally applied to the existing axial traction therapy, it was found that there were positive changes in the stress reduction and disc decompression effect of the annulus fibrosis in the posterior region and the posterior longitudinal ligaments of the spine. Further, in a study verifying the effectiveness of orthopedic correction devices for traction, the corrective device group added with positional traction in the supine state showed excellent effects in expanding the area of the central canal of the spine and improving lordosis angle, compared to the existing traction group in the axial direction. These results suggest that positional traction is effective in the treatment of not only the expansion of the intervertebral disc while maintaining the lordotic curve in the cervical and lumbar regions, but also the expansion of the lateral intervertebral foramen and the resulting traction.

Korean Patent Application Laid-Open No. 10-2020-0004780 relates to a thermo-therapeutic apparatus and a method for controlling the same, and it provides a spinal thermos-therapeutic apparatus which is capable of providing a target intensity of massage with the same pressure according to a body parts or a user.

(Patent Document 1) Korean Patent Application Laid-Open No. 10-2020-0004780

(Non-Patent Document 1) Frobin, W., Brinckmann, P., Biggemann, M., Tillotson, M., & Burton, K. (1997). Precision measurement of disc height, vertebral height and sagittal plane displacement from lateral radiographic views of the lumbar spine. Clinical Biomechanics, 12, S1-S63. DOI: 10.1016/S0268-0033(96)00067-8.

(Non-Patent Document 2) Saunders, H. D. (1979). Lumbar traction. Journal of Orthopedic & Sports Physical Therapy, 1(1), 36-45. DOI: 10.2519/jospt.1979.1.1.1.36.

DISCLOSURE

Technical Tasks

The embodiments describe a spinal traction algorithm and a thermal spinal massage device to which the same is applied, and more specifically provides a traction technique for the intervertebral discs of the cervical and lumbar segments by using a personal heater that is effective in relieving muscle pain and pushing the spine from the posterior to the anterior in the supine position.

The embodiments are directed to providing a spinal traction algorithm for implementing the Lordotic Curve Controlled Traction (LCCT) as the operating principle and performing a target curvature traction function by maintaining the curvature and generating a longitudinal force through axial movement and posterior-to-anterior synergy, and a thermal spinal massage device to which the same is applied.

Technical Solution

The spinal traction method according to an embodiment, which is applied to a thermal spinal massage device, allows a ceramic to travel along a spinal column on the basis of a spinal traction algorithm in order to deliver physical force to the spine, and generate force in at least two directions to help lordotic curve controlled traction (LCCT), wherein the spinal traction algorithm can generate a longitudinal tractive force as the ceramic horizontally travels while being in close contact with the spine in the axial direction along the spinal column and pulls the spine, and maintain a curve and generate a longitudinal tractive force as the ceramic rises from the posterior to the anterior.

Alternately applying or releasing a tractive force at preset intervals by using a mechanical device according to the spinal traction algorithm may implement a combination of intermittent traction and positional traction that places the user in various positions to pull spinal structures longitudinally.

Herein, the spinal traction algorithm may perform at least one of para-spinal muscle relaxation, sacroiliac joint relaxation, piriformis muscle relaxation, lumbar traction, equalization of spinal movements and cervical traction.

The spinal traction algorithm may include the steps of inducing relaxation of the transitional joint through a plurality of reciprocating movements of the ceramic by dividing the entire spinal column into a lumbopelvic section, a thoracic section and a cervical section in order to relax the para-spinal muscles: minimizing sciatica by relaxing the piriformis muscle while the ceramic travels multiple times across the posterior pelvis: and performing a plurality of reciprocating movements throughout the entire spinal column after ascending and descending of each of the ceramic to maintain sufficient intervertebral ROM.

The spinal traction method may further include the step of stopping the ceramic at the relevant area for relaxing the sacroiliac joint after inducing relaxation of the transitional joint to reduce sacroiliac joint displacement and relax the muscles.

The spinal traction method may further include the step of performing curvature and positional traction of the spinal column, as the ceramic performs traction on the lumbar region and ascends and descends (P to A, A to P) at a specific targeted lumbar level, after relaxing the piriformis muscle.

The step of performing a plurality of reciprocating movements throughout the entire spinal column after ascending and descending of each of the ceramic to maintain sufficient intervertebral ROM may include the step of enabling the curvature and positional traction of the spinal column by ascending and descending the ceramic multiple times at a specific level of the cervical section for traction of the cervical spine.

The step of performing a plurality of reciprocating movements throughout the entire spinal column after ascending and descending of each of the ceramic to maintain sufficient intervertebral ROM may reciprocate the entire spinal column multiple times to ensure that sufficient intervertebral ROM is maintained, and include three stop intervals.

The spinal traction algorithm may further include a preparatory massage (effleurage stroke) step of delivering a weak-intensity stimulation to the entire spinal column, before inducing relaxation of the transitional joint through the plurality of reciprocating movements.

The spinal traction algorithm may further include the step of attempting a final stretching of a specific section of the lumbar and cervical regions as the ceramic moves multiple times across the entire spinal column, and then inducing a reset of the para-spinal muscles through low-intensity moving, after the ceramic ascends and descends multiple times to enable curvature and positional traction of the spinal column.

The step of inducing relaxation of the transitional joint through a plurality of reciprocating movements of the ceramic may consider a traction role that can widen the intervertebral space when traveling in the cranial direction through the elevation of the ceramic for each section.

The step of performing a plurality of reciprocating movements throughout the entire spinal column after ascending and descending of each of the ceramic to maintain sufficient intervertebral ROM may consider a traction role that may lead to additional intervertebral spacing when traveling in the cranial direction.

The spinal traction algorithm may allow the ceramic to adhere in the axial direction along the spinal column and travel back and forth multiple times according to settings, and in all massage sections, there may be at least one section where the intensity in the caudal to cranial direction is greater than the intensity in the cranial to caudal direction.

The thermal spinal massage device to which a spinal traction algorithm is applied according to another embodiment may include a spinal traction algorithm control unit for assisting lordotic curve controlled traction (LCCT) by generating force in at least two directions while a ceramic travels along the spinal column on the basis of the spinal traction algorithm to deliver physical force to the spine, wherein the spinal traction algorithm control unit generates a longitudinal tractive force as the ceramic adheres in the axial direction along the spinal column, travels horizontally and performs traction on the spine, and maintains the curvature and generates a longitudinal tractive force as the ceramic acts upward from the posterior to the anterior.

The spinal traction algorithm control unit may include a para-spinal muscle relaxation unit for inducing relaxation of the transitional joint through a plurality of reciprocating movements of the ceramic, by dividing the entire spinal column into a lumbopelvic section, a thoracic section and a cervical section in order to relax the para-spinal muscles; a piriformis muscle relaxation unit for minimizing sciatica by relaxing the piriformis muscle while the ceramic travels multiple times across the posterior pelvis: and a spinal movement equalization unit for performing a plurality of reciprocating movements throughout the entire spinal column after ascending and descending of each of the ceramic to maintain sufficient intervertebral ROM.

The thermal spinal massage device may further include a sacroiliac joint relaxation unit for stopping the ceramic at the relevant area for relaxing the sacroiliac joint to reduce sacroiliac joint displacement and relax the muscles.

The thermal spinal massage device may further include a lumbar traction unit for performing curvature and positional traction of the spinal column, as the ceramic performs traction on the lumbar region and ascends and descends (P to A, A to P) at a specific targeted lumbar level.

The spinal movement equalization unit may include a cervical traction unit for enabling the curvature and positional traction of the spinal column by ascending and descending the ceramic multiple times at a specific level of the cervical section for traction of the cervical spine.

Advantageous Effects

According to the embodiments, it is possible to provide a spinal traction algorithm for implementing the LCCT as the operating principle and performing a target curvature traction function by maintaining the curvature and generating a longitudinal force through axial movement and posterior-to-anterior synergy, and a thermal spinal massage device to which the same is applied.

MODES OF THE INVENTION

Figure 1:
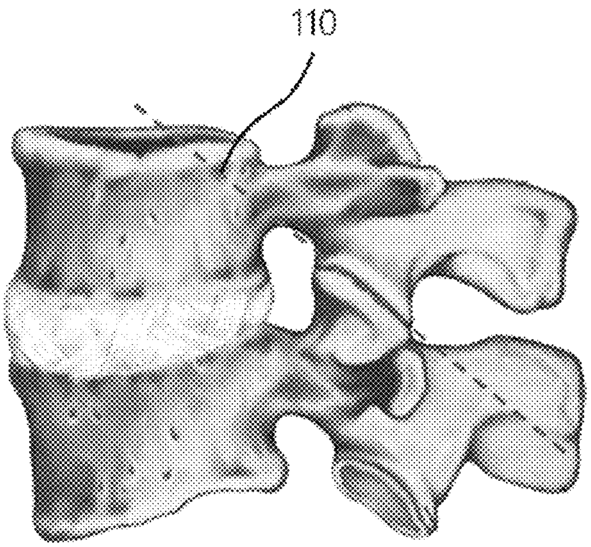
FIG. 1 is a diagram for explaining the direction of the articular surface of the spine according to an embodiment.

Hereinafter, the embodiments will be described with reference to the accompanying drawings. However, the described embodiments may be modified in various other forms, and the scope of the present invention is not limited by the embodiments described below. In addition, various embodiments are provided in order to more completely explain the present invention to those of ordinary skill in the art. The shapes and sizes of elements in the drawings may be exaggerated for clearer description.

The thermal spinal massage device is a medical device approved by the Ministry of Food and Drug Safety for the purpose of relieving muscle pain. The ceramic which is provided to massage the area around the spine while lying in a supine posture moves horizontally along the spine to perform anterior-posterior translational movement based on the subject. It is applied to alternately apply and release traction at preset intervals, functioning like intermittent mechanical traction. Meanwhile, in the case of a specific thermal spinal massage device, the ceramic stops at specific parts of the cervical and lumbar vertebrae to perform a positional traction operation, and in this case, the force applied by the ceramic to the spine from back to front acts as a lever by centering on the facet joints of the spine, so as to maintain the curvature, widen the disc space and help with decompression treatment.

The following embodiments provide a spinal traction algorithm and a thermal spinal massage device to which the same is applied, and it is confirmed whether the force of pushing from the posterior to the anterior of the spine in the supine state using a personal warmer that is effective in relieving muscle pain exhibits a traction effect on the intervertebral discs of the cervical and lumbar segments.

FIG. 1 is a diagram for explaining the direction of the articular surface of the spine according to an embodiment.

Spinal traction is a treatment option based on applying a longitudinal force to the spinal axis. In terms of functional anatomy, joint movement is related to joint shape. Therefore, the fact that whether the force applied to the spinal column can generate a longitudinal force for traction is the most important factor in determining the traction function. Accordingly, when the shape of a spinal joint surface 110 is checked based on spinal anatomy, generally, the cervical vertebra (C), thoracic vertebra (T) and lumbar vertebra (L) may be represented by BUM (Backward, Upward, Medial), BUL (Backward, Upward, Lateral) and BUM, as shown in FIG. 1.

Figure 2:
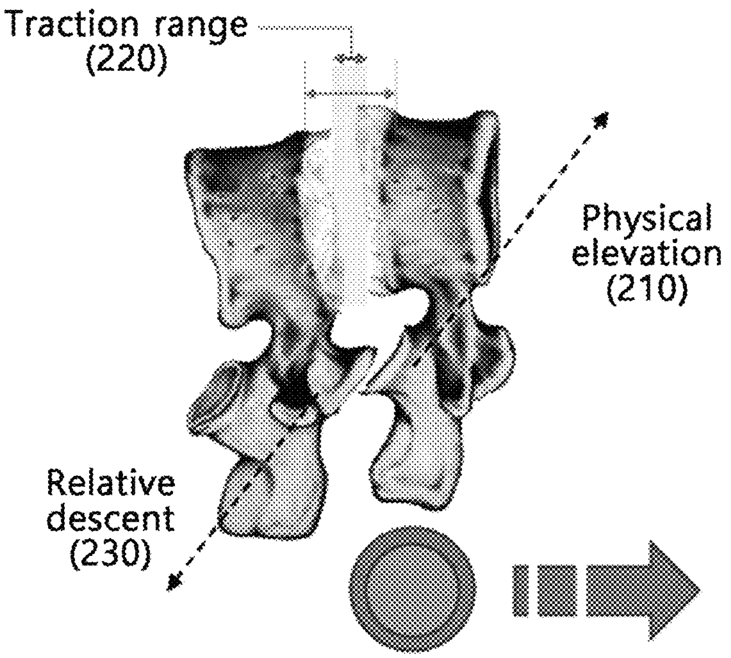
FIG. 2 is a diagram for explaining joint displacement through spinal traction of the thermal spinal massage device according to an embodiment.

FIG. 2 is a diagram for explaining joint displacement through spinal traction of the thermal spinal massage device according to an embodiment.

As illustrated in FIG. 2, the thermal spinal massage device according to an embodiment physically raises 210 one side along the articular surface direction of the spine, thereby relatively lowering the other side 220, and through this, it is possible to expand 230 the traction range in the transverse direction.

Figure 3:
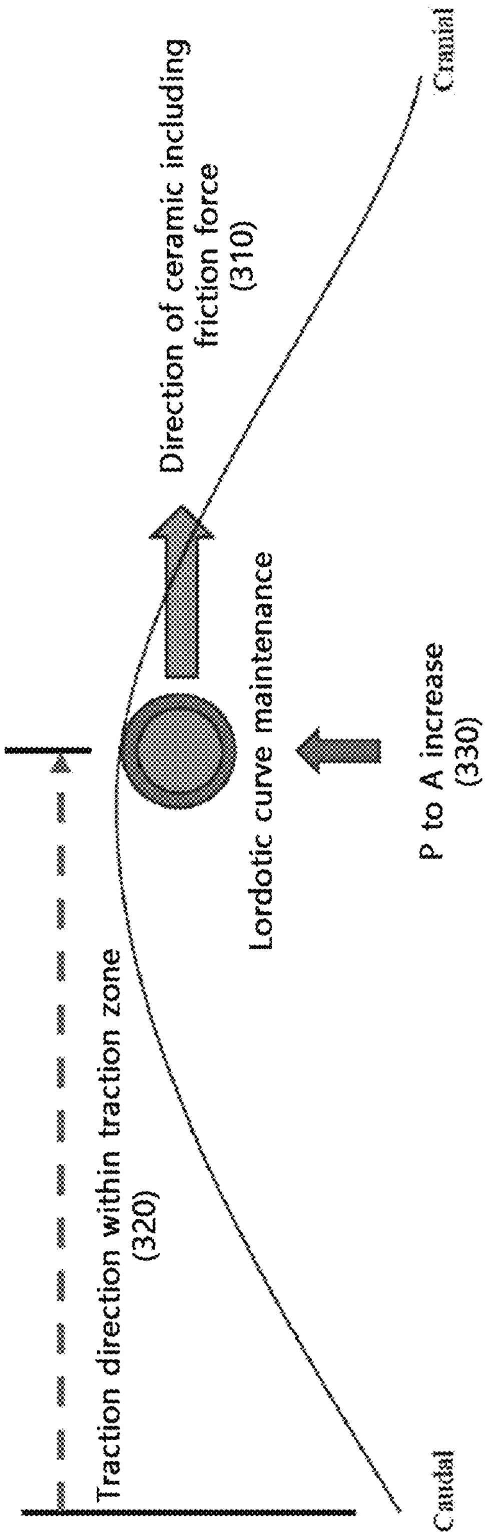
FIG. 3 is a diagram for explaining the spinal traction method according to an embodiment.

FIG. 3 is a diagram for explaining the spinal traction method according to an embodiment.

Referring to FIG. 3, the traction method of the thermal spinal massage device according to an embodiment may be explained by displaying 230 the movement 310 of the ceramic including frictional force in the axial direction of the spinal column, and the movement of the ceramic through the P to A rise of the spinal column, and displaying 330 the direction and section of the traction.

In the thermal spinal massage device according to an embodiment, a specific ceramic travels along the spinal column for the transfer of physical force and generates force in two directions to help LCCT (Lordotic Curve Controlled Traction), and this is based on the above anatomical evidence.

First of all, it is possible to generate a longitudinal force by utilizing axial movement. As illustrated in FIG. 3, it was confirmed that the thermal spinal massage device according to an embodiment is capable of generating a longitudinal tractive force that is equivalent to a maximum average of about 32 kgf·cm for a 55 kg conduction body, for example, when the ceramic travels and performs traction horizontally and in close contact in the axial direction, and the calculation of tractive force may be expressed as the following formula.

$$\text{Tractive force (Kgf cm)} = \text{Load deceleration motor torque (Kgf cm)} - \text{No-load deceleration motor torque (Kgf cm)} \quad \text{[Mathematical Formula 1]}$$

Since it has been found that the corrective effect is maximized at the tractive force corresponding to 30 to 50% of the user's body weight in general, the tractive force for the device is sufficient to realize this range.

Figure 4:
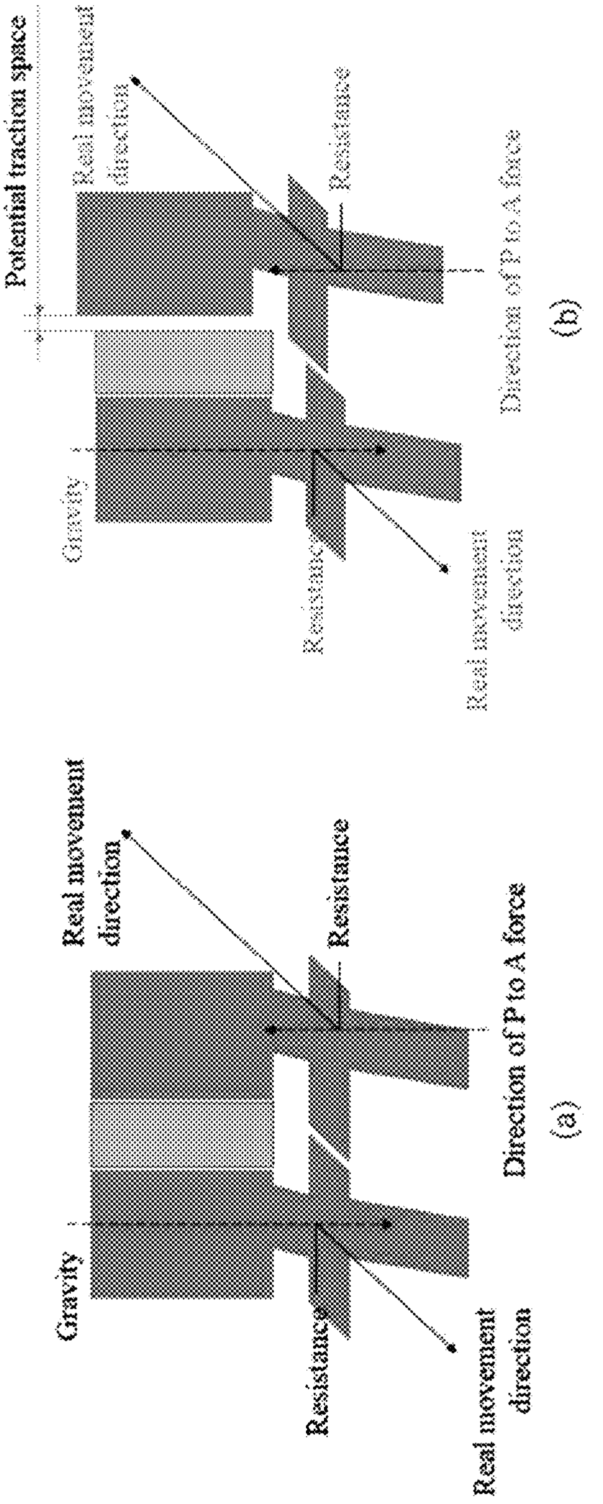
FIG. 4 is a diagram for explaining the curvature maintenance and longitudinal force through synergy according to an embodiment.

FIG. 4 is a diagram for explaining the curvature maintenance and longitudinal force through synergy according to an embodiment.

Referring to FIG. 4, it is possible to maintain the curvature and generate a longitudinal force through P to A (Posterior to Anterior, back to front) synergy. This movement is a very important motion to maintain the curvature of the spine required in LCCT, and at the same time, it may induce positional traction to induce more effective traction. In the case of the thermal spinal massage device according to an embodiment, when the P to A (back to front) synergy achieved, longitudinal traction is additionally achieved according to the shape of the anatomical articular surface.

Therefore, the spinal traction device may apply a longitudinal force to the vertebral axis to achieve spinal traction. Meanwhile, the electric orthopedic traction device applied to the spine includes a drive mounting unit (electrical device such as a motor, etc.) among devices that can apply a longitudinal force to the spinal column axis for spinal traction.

Joint displacement through spinal traction may be achieved by using the thermal spinal massage device according to an embodiment. Herein, the tractive force may need to be large enough to cause the vertebral segments to move and cause structural changes. Further, in order for the tractive force to work effectively on the spine, the friction force may need to be minimized, and the patient may need to be in a relaxed state for the whole body.

The thermal spinal massage device according to an embodiment is designed to play the role of LCCT by complexly implementing intermittent traction and positional traction through a motorized device. Herein, intermittent traction is similar to sustained traction in intensity and duration, but uses a mechanical device to alternately apply and release tractive force at preset intervals. In addition, positional traction is applied by placing the patient in various positions by using pillows, blocks or sandbags to pull the spinal structures longitudinally. Generally, it involves lateral bending and affects only one side of the vertebral segments. For example, intermittent traction may be performed for 3 to 5 minutes with a 60-second traction and a 20-second break. Positional traction may be positioned 1 to 2 level above the corresponding joint. In this case, preparatory arbitration and main arbitration procedures for traction may be required.

Figure 5:
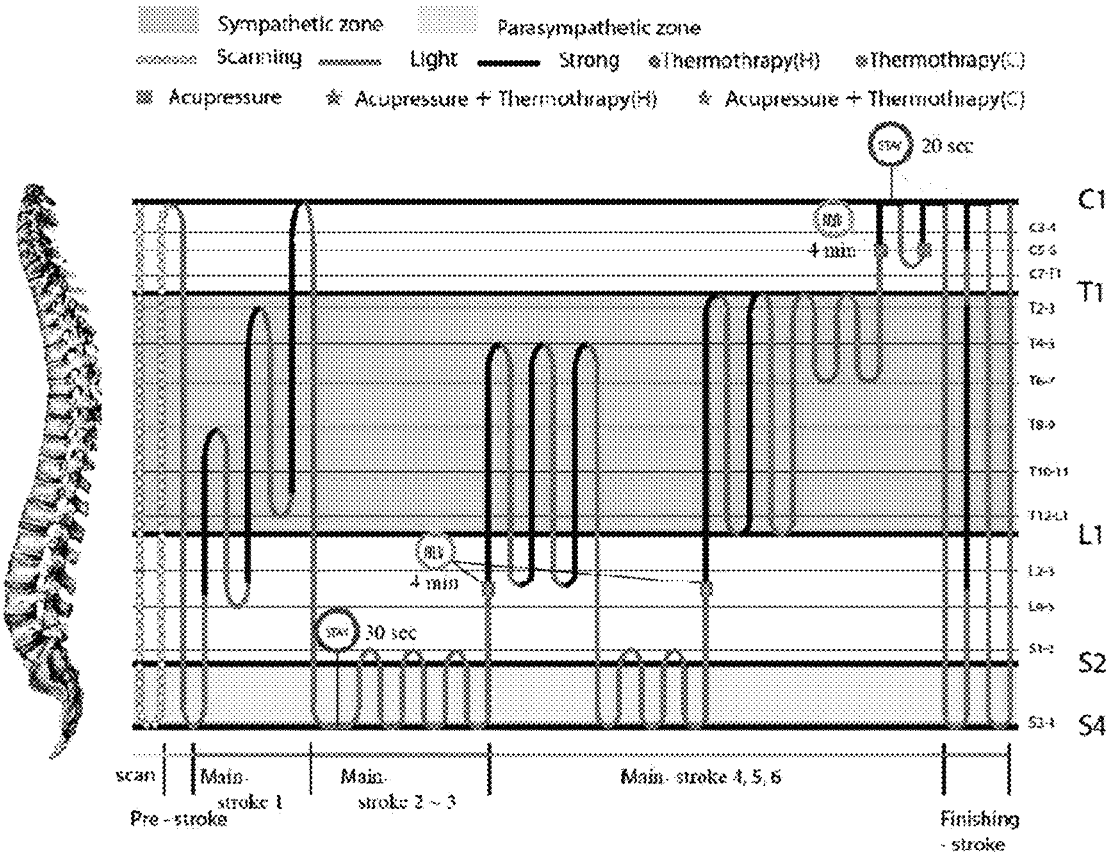
FIG. 5 is a diagram for explaining the spinal traction algorithm according to an embodiment.

FIG. 5 is a diagram for explaining the spinal traction algorithm according to an embodiment.

Referring to FIG. 5, the spinal traction algorithm according to an embodiment may perform para-spinal muscle relaxation, sacroiliac joint relaxation, piriformis muscle relaxation, equalization of spinal column movements, lumbar traction and cervical traction. The spinal traction algorithm according to an embodiment may be represented as shown in Table 1.

TABLE 1

| | |
|---|---|
| objective: | The objective is to widen the intervertebral space, and this function is expected to help with some herniated discs and stenosis. |
| Pre-stroke: | Corresponding to preparatory massage (effleurage stroke) |
| Main-stroke 1: | Para-spinal muscle relaxation |
| Main-stroke 2: | Sacroiliac joint relaxation |
| Main-stroke 3: | Piriformis m. release |
| Main-stroke 4: | Mainly lumbar traction |
| Main-stroke 5: | Equalization of spinal column movement |
| Main-stroke 6: | Mainly cervical traction |
| Finishing stroke: | General background |

The spinal traction algorithm may relieve pain by stretching the structures of the spine and removing stimulation or compression of nerve roots. Hereinafter, the spinal traction algorithm and the thermal spinal massage device to which the same is applied will be described in more detail.

Figure 6:
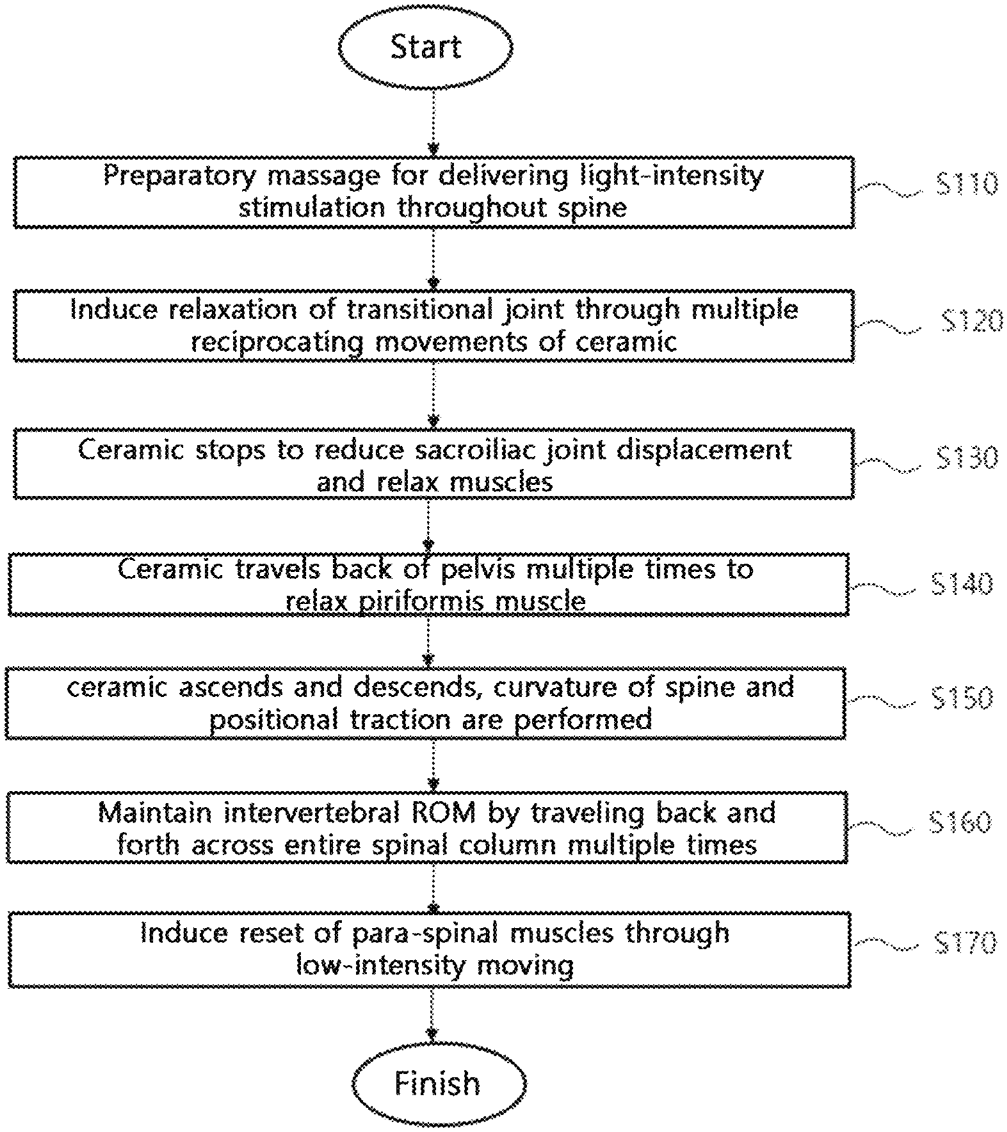
FIG. 6 is a flowchart showing the spinal traction method according to an embodiment.

FIG. 6 is a flowchart showing the spinal traction method according to an embodiment.

In the spinal traction method applied to the thermal spinal massage device according to an embodiment, a ceramic travels along a spinal column based on a spinal traction algorithm to deliver a physical force to the spine and generates force in at least two directions such that it may help with Lordotic Curve Controlled Traction (LCCT).

The spinal traction algorithm generates a longitudinal tractive force as the ceramic is in close contact in the axial direction along the spinal column and travels horizontally and performs traction on the spine, and the ceramic works synergistically from the back to the front (Posterior to Anterior) to maintain the curvature and generate a longitudinal tractive force. In addition, alternately applying or releasing a tractive force at preset intervals by using a mechanical device according to the spinal traction algorithm implements a combination of intermittent traction and positional traction that places the user in various positions to pull spinal structures longitudinally.

The spinal traction algorithm may perform at least any one or more of para-spinal muscle relaxation, sacroiliac joint relaxation, piriformis muscle relaxation, lumbar traction, equalization of spinal movements and cervical traction.

More specifically, as illustrated in FIG. 6, the spinal traction algorithm may be performed by including the steps of inducing relaxation of the transitional joint through a plurality of reciprocating movements of the ceramic by dividing the entire spinal column into a lumbopelvic section, a thoracic section and a cervical section in order to relax the para-spinal muscles (S120): minimizing sciatica by relaxing the piriformis muscle while the ceramic travels multiple times across the posterior pelvis (S140); and performing a plurality of reciprocating movements throughout the entire spinal column after ascending and descending of each of the ceramic to maintain sufficient intervertebral ROM (S160).

In this case, the spinal traction algorithm may further include the step of a preparatory massage (effleurage stroke) step of delivering a weak-intensity stimulation to the entire spinal column, before inducing relaxation of the transitional joint through the plurality of reciprocating movements (S110).

The spinal traction algorithm may further include the step of stopping the ceramic at the relevant area for relaxing the sacroiliac joint to reduce sacroiliac joint displacement and relax the muscles (S130).

The spinal traction algorithm may further include the step of performing curvature and positional traction of the spinal column, as the ceramic performs traction on the lumbar region and ascends and descends (P to A, A to P) at a specific targeted lumbar level, after relaxing the piriformis muscle (S150).

In addition, the spinal traction algorithm may further include the step of attempting a final stretching of a specific section of the lumbar and cervical regions as the ceramic moves multiple times across the entire spinal column, and then inducing a reset of the para-spinal muscles through low-intensity moving, after the ceramic ascends and descends multiple times to enable curvature and positional traction of the spinal column (S170).

Herein, step S160 may be performed by include the step of enabling the curvature and positional traction of the spinal column by ascending and descending the ceramic multiple times at a specific level of the cervical section for traction of the cervical spine.

Hereinafter, the spinal traction method which is applied to the thermal spinal massage device according to an embodiment will be described in more detail.

The spinal traction method which is applied to the thermal spinal massage device according to an embodiment may be described with the spinal traction device according to an embodiment as an example.

Figure 7:
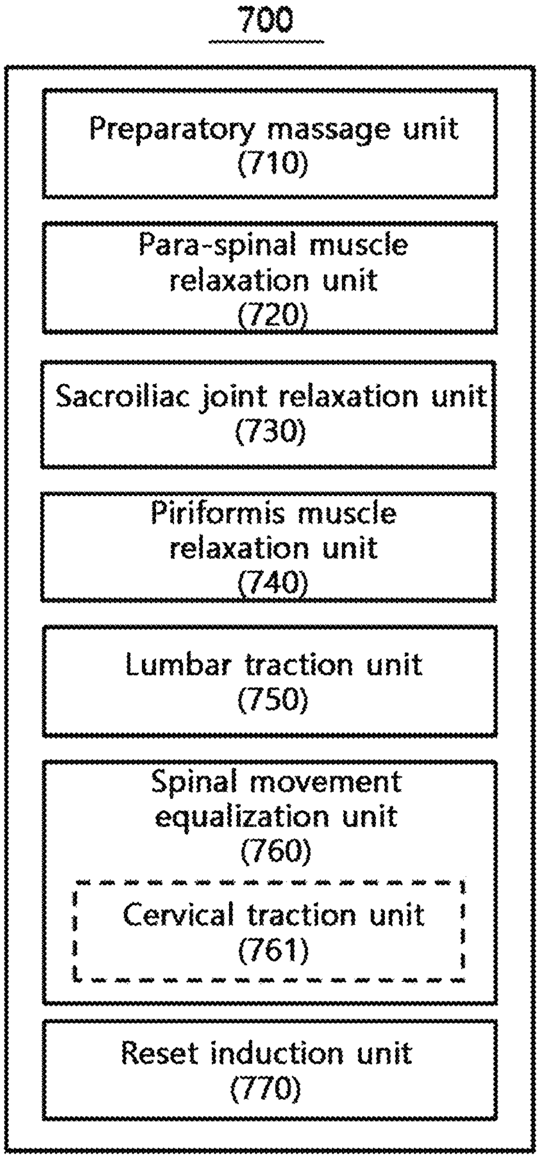
FIG. 7 is a block diagram showing the spinal traction device according to an embodiment.

FIG. 7 is a block diagram showing the spinal traction device according to an embodiment.

Referring to FIG. 7, the thermal spinal massage device to which the spinal traction algorithm according to an embodiment is applied may include a spinal traction algorithm control unit 700. Herein, the spinal traction algorithm control unit 700 may include a para-spinal muscle relaxation unit 720, a sacroiliac joint relaxation unit 730, a piriformis muscle relaxation unit 740, a lumbar spine traction unit 750 and a spinal movement equalization unit 760. According to embodiments, it may further include a preparation massage unit 710 and a reset induction unit 770, and may further include a cervical spine traction unit 761. Hereinafter, the spinal traction algorithm and the thermal spinal massage device to which the spinal traction algorithm is applied will be described in more detail with reference to FIG. 5 as an example. Meanwhile, FIG. 5 is only an example of an optimal spinal traction algorithm, and the spinal traction algorithm is not limited thereto.

The spinal traction algorithm control unit 700 may help the LCCT traction by generating forces in at least two directions while the ceramic travels along the spinal column based on the spinal traction algorithm for the delivery of physical force to the spine. The spinal traction algorithm control unit 700 generates a longitudinal tractive force as the ceramic is in close contact in the axial direction along the spinal column and performs traction the spine, and the ceramic works synergistically from the posterior to the anterior to maintain the curvature and generate a longitudinal tractive force. In addition, the spinal traction algorithm control unit 700 may use a mechanical device to alternately apply or release a tractive force at preset intervals to implement a combination of intermittent traction and positional traction that places the user in various positions to vertically pull the spinal structure. The spinal traction algorithm, for example, as illustrated in FIG. 5, causes the ceramic to be in close contact in the axial direction along the spinal column and reciprocate multiple times according to settings, and in all sections of the massage, there may be at least one section where the intensity in the caudal to cranial direction is greater than the intensity in the cranial to caudal direction.

The spinal traction algorithm control unit 700 may perform at least any one or more of para-spinal muscle relaxation, sacroiliac joint relaxation, piriformis muscle relaxation, lumbar traction, equalization of spinal movements and cervical traction.

More specifically, in step S110, the preparatory massage unit 710 is a step to increase the temperature of the muscles for relaxation, blood circulation and lymph flow and prepare for a massage technique of stronger stimulation, and it may perform a preparatory massage (effleurage stroke), which delivers weak-intensity stimulation to the entire spinal column (pre stroke).

In step S120, for the main purpose of para-spinal muscle relaxation, the para-spinal muscle relaxation unit 720 may divide the entire section of the spinal column into a lumbopelvic section (L), a thoracic section (T) and a cervical section (C), and induce relaxation of the transitional joint through multiple reciprocating movements of the ceramic. In addition, the para-spinal muscle relaxation unit 720 may consider a traction role that can widen the intervertebral spacing when traveling in the cranial direction through the rise of the ceramic for each section (Main stroke 1). The para-spinal muscle relaxation unit 720 may gradually move from the caudal direction to the cranial direction and induce relaxation of the transitional joint through a plurality of reciprocating movements of the ceramic in a predetermined section, and in this case, it may be set such that there is at least one section where the intensity in the caudal to cranial direction is greater than the intensity in the cranial to caudal direction.

In step (S130), the sacroiliac joint relaxation unit 730 may stop the ceramic at the relevant area in order to minimize instability in the sacroiliac joint area (indicated as stay in a red circle), thereby reducing sacroiliac joint displacement and relaxing the muscles (Main stroke 2).

In step S140, the piriformis relaxation unit 740 may minimize sciatica by relaxing the piriformis muscle while the ceramic travels the rear pelvis multiple times (Main stroke 3).

In step S150, the lumbar traction unit 750 may perform curvature and positional traction of the spinal column (indicated as mm in a 4 min green circle), as the ceramic performs traction on the lumbar region and ascends and descends (P to A, A to P) at a specific targeted lumbar level (Main stroke 4). In this case, it may be set such that there is at least one section in which the intensity in the caudal to cranial direction is greater than the intensity in the cranial to caudal direction.

In step S160, the spinal column motion equalization unit 760 may perform a plurality of reciprocating movements throughout the entire spinal column after ascending and descending of each of the ceramic to maintain sufficient intervertebral ROM (Main stroke 5). A plurality of reciprocating movements throughout the entire spinal column is not a simple repetitive movement of sections Cl to S4, but for example, as illustrated in FIG. 5, it may reciprocate multiple times according to the spinal traction algorithm. In this case, three stop intervals may be included. In addition, the spinal column motion equalization unit 760 may consider a traction role that may further increase the intervertebral spacing when traveling in the cranial direction.

Meanwhile, the spinal column movement equalization unit 760 may include a cervical traction unit 761, and at the rear end of step S160, the cervical traction unit 761 may enable the curvature and positional traction of the spinal column by ascending and descending the ceramic multiple times at a specific level of the cervical section for traction of the cervical spine (Main stroke 6). In addition, it is possible to enable positional traction of the entire cervical vertebrae with the weight of the cranium by stopping the ceramic in the suboccipital region (indicated as stay in a red circle).

In step S170, the reset induction unit 770 may drive the ceramic through the entire section of the spinal column multiple times, attempt a final stretching of a specific section of the lumbar and cervical spine, and then induce a reset of the para-spinal muscles through low-intensity driving (Finishing stroke).

As described above, the thermal spinal massage device according to an embodiment scans the user's entire spine by driving a heating device (ceramic), measures the operating current of the horizontal motor to calculate the length of the spine of the human body, and utilizes a method of accurately identifying the positions of each of the cervical, thoracic, lumbar and coccyx vertebrae that make up the spine to elevate and lower the corresponding area. In particular, the thermal spinal massage device according to an embodiment implements LCCT, which is the principle of action, through maintenance of curvature and generation of longitudinal force through axial movement and P to A (posterior to anterior) synergy, so as to function as a target curvature traction. According to the examples, it can be seen that there is a traction effect in the cervical and lumbar vertebrae through changes in the height and area of the vertebral intervertebral discs.

An object of the present examples is to verify the traction effect of the back-to-front pushing force of the spine acting on the thermal spinal massage device on the intervertebral discs of the cervical and lumbar segments. In order to achieve this object, in 10 healthy adults (female, 40%), X-rays were taken between the cervical $4^{th}/5^{th}$ segments (Cervical4-5) and the cervical $5^{th}/6^{th}$ segments (C5-6) during the baseline and traction movements, and MRI was measured between the $3^{rd}/4^{th}$ lumbar vertebral segments (Lumbar3-4) and the $4^{th}/5^{th}$ lumbar vertebrae segments (L4-5). As a result of the study, the average heights of the disc, the front of the disc and the middle of the disc in all C4-5, C5-6, L3-4, and L4-5 segments significantly increased during traction compared to the baseline. The Cobb's angle, which was measured based on the lower surface of lumbar 1 and the upper surface of sacral 1, also significantly increased in the L3-4 and L4-5 segments. As a result, it can be confirmed that there is a traction effect on the cervical and lumbar regions when the spinal heating massage device is applied.

Hereinafter, the tests for verifying the traction effect of the thermal spinal massage device on the cervical and lumbar regions will be described as examples.

Example

According to an embodiment, 10 healthy adults without musculoskeletal disorders and any restrictions on physical activity (female ratio: 40%, age: 28.1±8.9 years old, height: 171±10, weight: 74.8±20.7 kg, body mass index: 27.1±5.5 kg/m$^2$) were targeted. In this clinical trial, the random allocation method was used to prevent possible bias that may be involved in the allocation of each test order. The investigator assigned a screening number in the order in which the consent form was completed, and assignment numbers were sequentially assigned to subjects who met the selection/exclusion criteria at the baseline visit. The random allocation table was prepared by an independent statistician who was not related to the present example, and the ratio between test sequences was set to be 1:1.

The present example was approved by the Institutional Research Ethics Review Board (IRB), and all study participants voluntarily participated in the study after being fully explained about the purpose and method of the study before participating in the study.

Figure 8:
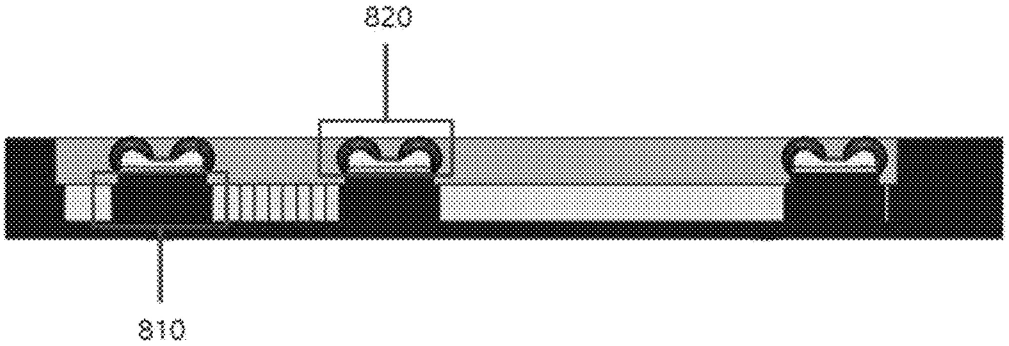
FIG. 8 is a diagram for explaining the thermal spinal massage device according to an embodiment.

FIG. 8 is a diagram for explaining the thermal spinal massage device according to an embodiment.

Referring to FIG. 8, in this test, a ceramic-like plastic model ceramic 810 and an auxiliary mat on which the subject could lie were manufactured that were not affected by X-rays and magnetic resonance imaging (MRI) and were used to generate the same force of the thermal spinal massage device CGM MB-1901 (CERAGFEM Co., Ltd., Cheonan, Korea) that compresses the spine from back to front. In order to apply a system that adjusts the height according to intensity, the height of the model ceramic 810 was adjusted by using a 1$^{st}$ level block and a 9$^{th}$ level block 820. More specifically, the basic mat is where the user's upper body rests and provides spinal traction, and the plastic model ceramic 810 is made of a plastic model and can apply pressure around the spine from back to front. A stand 820 that supports the ceramic uses a vertical motor to classify the intensity into levels 1 to 9, and the area that exerts a force pushing from back to front is implemented by using wood that is not affected by X-rays and MRI, and since it consists of two plastic stands for height adjustment, it may be changed depending on the intensity to generate a pushing force from back to front. The auxiliary mat is where the lower half of the user's body is placed.

The thermal spinal massage device is a device used for the purpose of relieving muscle pain by heating and massaging around the spine, and in this test, it is possible to perform the experiment by removing the heating function of this device and using only the device for massaging the para-spinal muscles. The ceramic, which is designed to massage the para-spinal muscles in the supine position, moves along the spine while continuing forward-backward translational motions based on the subject. In this case, the force from the posterior to the anterior applied by the ceramic to the spine acts as a lever around the facet joint of the spine, which has the effect of widening the disc space.

In the present example, the front, middle and rear heights of the corresponding discs were measured at the baseline (level 1) and at the height during the traction operation (level 9). For baseline measurement, the cervical spine was measured between the 4$^{th}$/5$^{th}$ cervical vertebrae (C4-5) and 5$^{th}$/6$^{th}$ cervical vertebrae (C5-6) in the supine position on the base mat and the model ceramic adjusted to the height of level 1, and the lumbar region was measured between the 3$^{rd}$/4$^{th}$ segment (L3-4, L3-4) and the 4$^{th}$/5$^{th}$ lumbar segment (L4-5, L4-5), respectively. Further, in to verify the traction effect during the traction operation, the study participant was placed in a supine position on the basic mat and the model ceramic adjusted to the height of level 9, and it was measured between C4-5 and C5-6, and between L3-4 and L4-5, respectively.

The boundary between the superior and inferior endplates of the intervertebral disc was performed by the researcher in a non-face-to-face occlusion method after consulting a radiologist with 10 years of experience. For the height of the intervertebral disc, "image J", which is an image processing software provided free of charge by the National Institutes of Health (NIH), was used.

Figure 9:
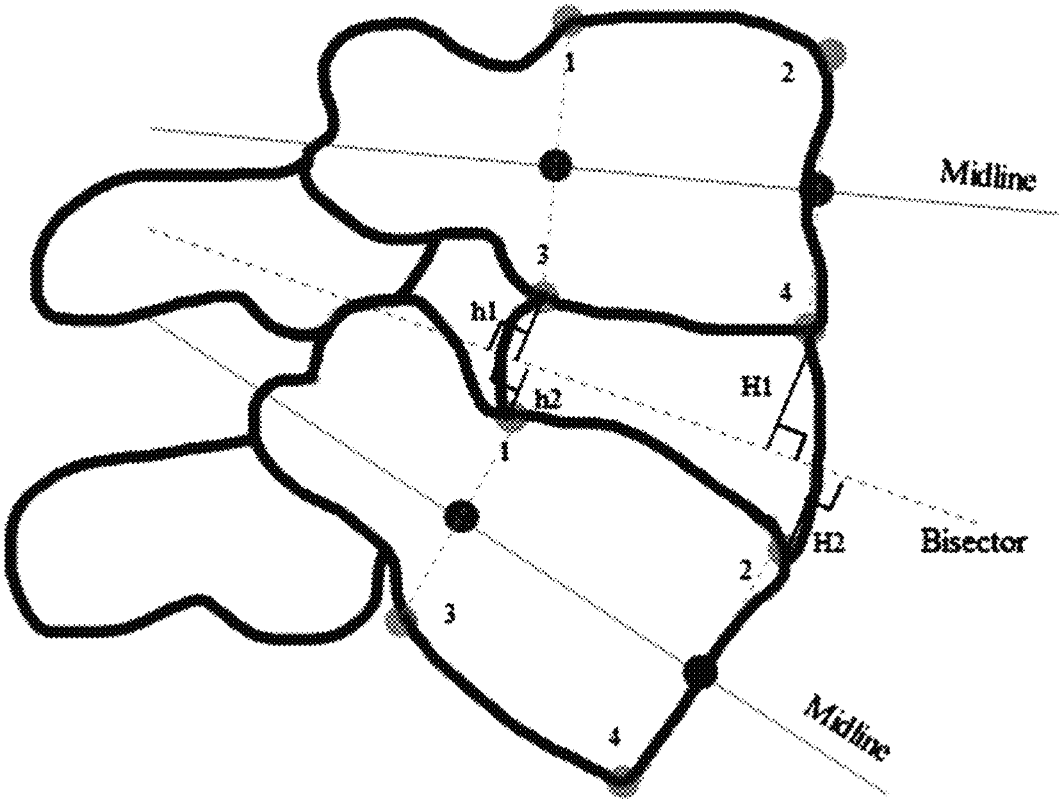
FIG. 9 is a diagram showing the disk height measurement method according to an embodiment.

FIG. 9 is a diagram showing the disk height measurement method according to an embodiment.

Referring to FIG. 9, the method of calculating the intervertebral disc height and the Cobb's angle using the measured data is as follows. First, the height of the intervertebral discs of the cervical and lumbar vertebrae was calculated by using the Frobin method (Non-Patent Document 1). The anterior disc height was calculated by h2+h4, the posterior disc height was calculated by h1+h3, and the central disc height was calculated by the sum of the distances of straight lines that pass between the midpoints of numbers 3 and 4 of the interior border of the upper vertebral body and the midpoints of numbers 1 and 2 of the superior border of the lower vertebrae and are perpendicular to a bisector.

Figure 10:
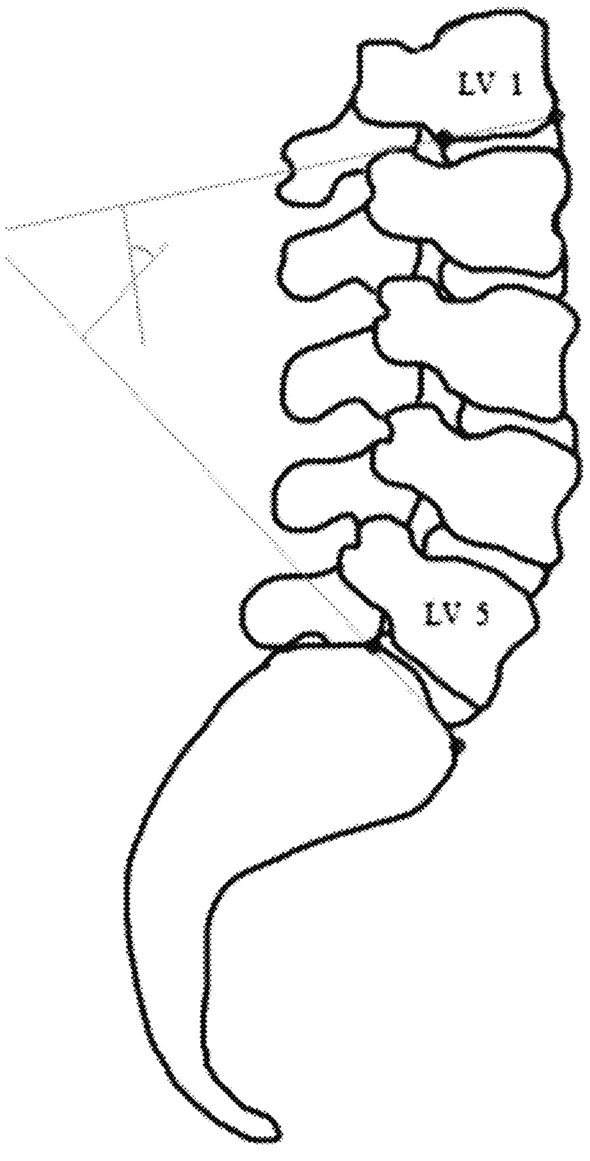
FIG. 10 is a diagram showing the method of measuring the Cobb's angle according to an embodiment.

FIG. 10 is a diagram showing the method of measuring the Cobb's angle according to an embodiment.

Second, as illustrated in FIG. 10, the Cobb's angle of the lumbar vertebrae was evaluated based on the lower surface of the lumbar vertebrae number 1 and the upper surface of the sacral vertebrae number 1.

In the present example, SPSS ver. 22.0 for Window was used, and the detailed data processing method is as follows. Descriptive statistics were performed to calculate the mean and standard deviation of physical characteristics and all associated data. In order to evaluate the traction effect on the intervertebral discs of the cervical segments (C4-5, C5-6) and the lumbar segments (L3-4, L4-5), a paired sample t-test was performed to determine the change in height, the change in cervical disc area and the change in the lumbar Cobb's angle during traction compared to the baseline. The significance level of all statistical tests was set at $\alpha$=0.05.

The study results are described below.

Changes in Cervical Segment

Table 2 compares the average height (mm) change of cervical discs during traction compared to the baseline.

TABLE 2

| | Baseline | Traction | p-value |
|---|---|---|---|
| C4-5 | 4.9 ± 0.56 | 5.4 ± 0.69 | 0.002 |
| C5-6 | 5.6 ± 0.79 | 6.1 ± 0.94 | <0.001 |

Referring to Table 2, in both of C4-5 and C5-6, the average height of cervical discs increased in all subjects during the traction operation compared to the baseline, and statistically significant results were confirmed.

In addition, Table 3 compared the average ($mm^2$) change in cervical disc area during the traction operation compared to the baseline in the median plane.

TABLE 3

| | Baseline | Traction | p-value |
|---|---|---|---|
| C4-5 | 106.9 ± 19.88 | 118.3 ± 27.11 | 0.006 |
| C5-6 | 120.4 ± 31.18 | 129.8 ± 32.18 | <0.001 |

Referring to Table 3, the disc area increased during the traction operation compared to the baseline in the cervical disc, and the result was statistically significant.

According to the results of previous studies, it was reported that during traction therapy, suction caused by tension of the posterior longitudinal ligament and negative intradiscal pressure occurred. As such, it can be confirmed that the reduction of intra-disc pressure is an important factor in traction therapy. The disc is elongated by traction, which increases the volume of the discs and reduces the internal pressure. In conclusion, it can be seen that the internal negative pressure of the cervical discs was generated by the therapy according to the present example.

Changes in Lumbar Segment

In order to evaluate the traction effect on the intervertebral discs of the lumbar segments (L3-4, L4-5), the results of comparing the height change compared to the baseline can be shown in Table 4. Table 4 shows the change in mean height (mm) in vertebral segment spacing.

TABLE 4

| | Baseline | Traction | p-value |
|---|---|---|---|
| L3-4 | 11.48 ± 1.27 | 12.21 ± 1.03 | <0.001 |
| L4-5 | 11.57 ± 1.60 | 12.21 ± 1.39 | <0.001 |

Referring to Table 4, in both of the L3-4 and L4-5 regions, the average height of the discs significantly increased during the traction operation compared to the baseline ($p<0.001$). As a result, it can be confirmed that the average height of the lumbar discs was increased by the force of pushing the spine from the posterior to the anterior in the present example such that there was an effect of traction.

In addition, Table 5 compares the average ($mm^2$) change of the lumbar disc area during the traction operation compared to the baseline in the median plane.

TABLE 5

| | Baseline | Traction | p-value |
|---|---|---|---|
| L3-4 | 429.3 ± 61.07 | 439.7 ± 53.33 | 0.009 |
| L4-5 | 428.5 ± 77.47 | 442.0 ± 77.68 | 0.006 |

Referring to Table 5, the disc area increased during the traction operation compared to the baseline in the lumbar disc, and the result was statistically significant. Compared to the baseline, the area was significantly increased in the traction operation. In conclusion, it can be seen that the negative pressure inside the lumbar disc was generated by the therapy according to the present example.

The change (mm) of the Cobb's angle during the traction operation compared to the baseline based on the lower surface of the lumbar vertebrae 1 and the upper surface of the sacral vertebrae 1 can be represented as shown in Table 6.

TABLE 6

| | Baseline | Traction | p-value |
|---|---|---|---|
| L3-4 | 53.48 ± 8.21 | 68.55 ± 4.60 | <0.001 |
| L4-5 | 55.17 ± 10.38 | 67.95 ± 5.44 | <0.001 |

Referring to Table 6, both of the L3-4 and L4-5 regions were statistically significantly increased in the traction motion compared to the baseline ($p<0.05$).

Figure 11:
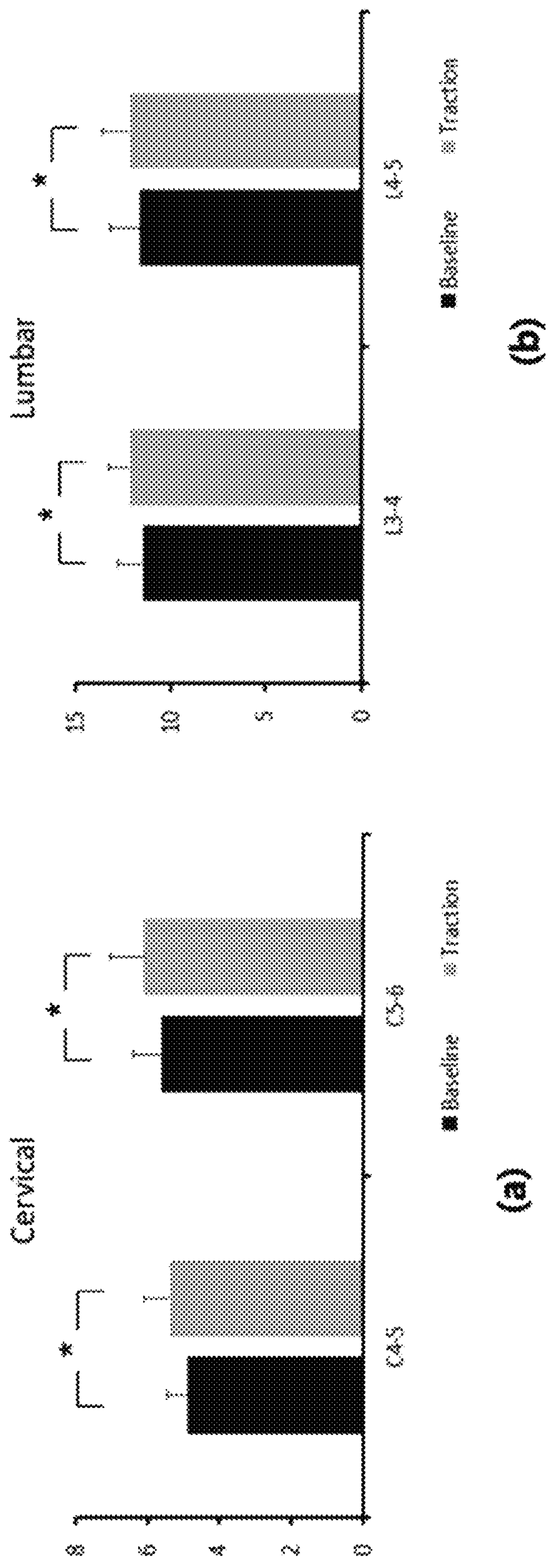
FIG. 11 is a diagram showing the average height change of a disk according to an embodiment.

FIG. 11 is a diagram showing the change in height of discs according to an embodiment. More specifically, (a) of FIG. 11 shows the change in the average disc height during the baseline of the cervical vertebrae and the traction operation, and (b) shows the change in and the average disc height during the baseline of the lumbar vertebrae the traction operation.

This example was intended to verify the traction effect of the posterior to anterior pushing force of the spine acting on the thermal spinal massage device on the intervertebral discs of the cervical and lumbar segments. As the first study to verify the traction effect using the thermal spinal massage device, the results of this study could not be directly compared with previous studies, but the results can be discussed based on previous studies on traction therapy as follows.

As illustrated in FIG. 11, the average disc height during the traction operation compared to the baseline of the thermal spinal massage device was statistically significantly increased in both of the cervical and lumbar vertebrae. Disc area also increased statistically significantly in both of cervical and lumbar vertebrae. The Cobb's angle was also significantly increased during the traction operation in both of lumbar segments L3-4 and L4-5. This example suggests that the thermal spinal massage device using the force of pushing the spine posterior to anterior may help the intervertebral disc herniation by increasing the lordosis of the cervical and lumbar vertebrae.

The results of this study were partially consistent with the results of a study that verified the traction effect of the lordotic curve maintenance traction device (LCCT) including a positional traction operation in the supine position in 40 patients with lumbar disc herniation. In that study, in addition to the conventional axial traction therapy (traditional traction), the treatment including positional traction in a specific area in the supine position proved to be effective in improving the angle of the lumbar intervertebral disc.

Further, in the previous studies, the traction therapy effect of the conventional axial traction therapy group and the lordotic curve maintenance traction device group were compared for 40 patients with lumbar disc herniation 3 times a week for 5 weeks. As a result, it was confirmed that significant improvement in morphology was shown, such as expansion of the central canal area of the spine, in the group using the LCCT traction device. In addition to the above, there are studies that prove that positional traction considering the curvature of the spine is effective for pain relief. These results show that positional traction, which applies a tractive force to the spine while maintaining the lordotic curve, rather than axial traction therapy that does not consider curvature, helps to improve symptoms such as nerve root compression due to disc herniation, and at the same time, this means that it is possible to reduce pain caused by excessive stretching of the posterior muscles and ligaments that can occur with axial traction.

Figure 12:
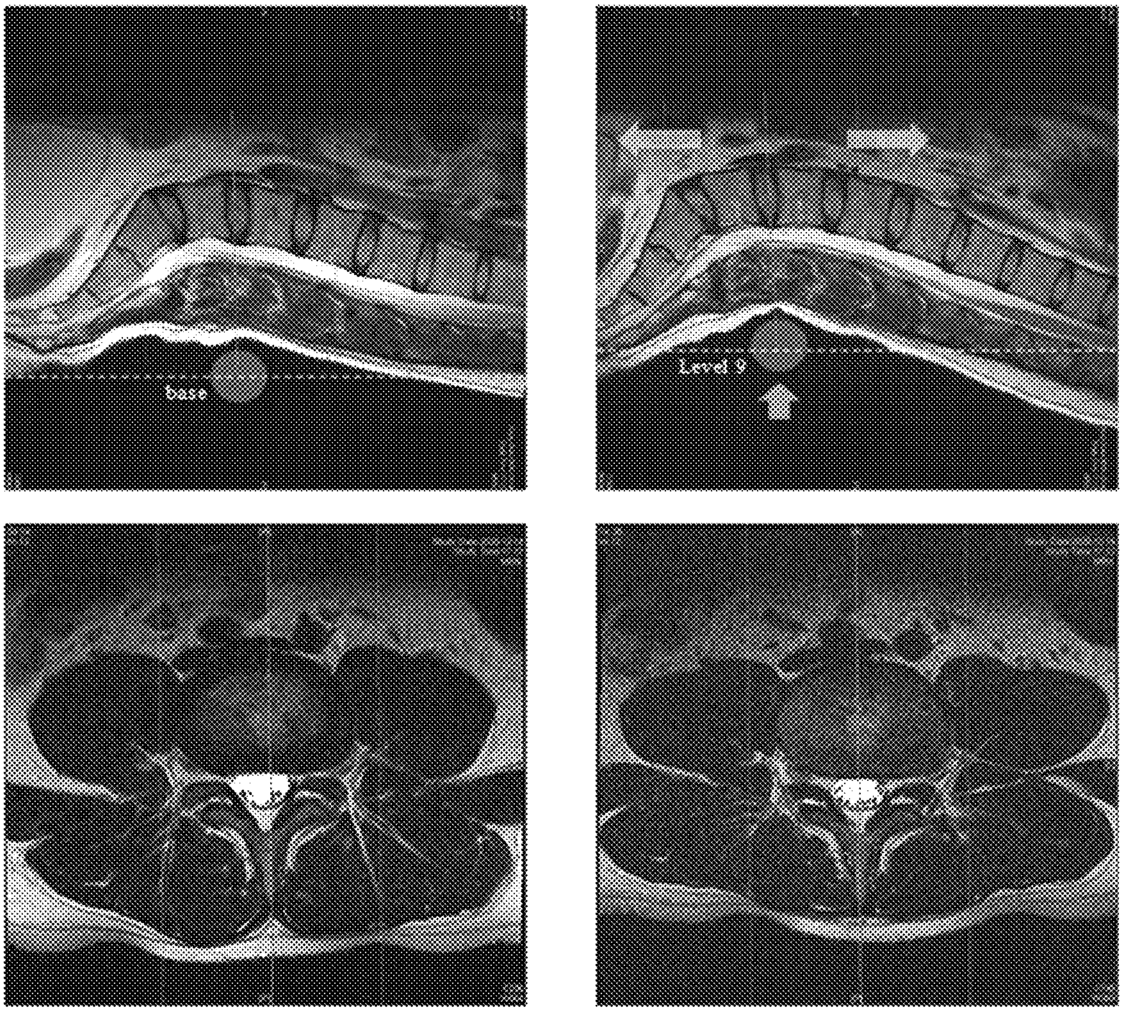
FIG. 12 is a diagram showing a central spinal canal MRI during the baseline and traction operation according to an embodiment.

FIG. 12 is a diagram showing a central spinal canal MRI during the baseline and traction operation according to an embodiment.

The ultimate goal of spinal traction is to relieve pain by elongating the spinal structures and removing stimulation or compression of the nerve roots. FIG. 12 is an MRI photograph taken in this example, and it can be confirmed that the expansion appears in the central canal region of the spine during the traction operation when compared with the baseline. This suggests that a thermal spinal massage device that simultaneously applies intermittent traction and positional traction while the ceramic moves can help manage disc and spinal stenosis while maintaining the normal curved shape of the spine.

The present examples were intended to objectively verify through MRI imaging whether the force of the thermal spinal massage device, which is proposed to massage the para-spinal muscles while lying in a supine state, has a traction effect by pulling the spinal structure vertically. As a result, it was confirmed that the thermal spinal massage device used in this example conforms to several principles of traction.

First, the traction may need to be large enough to cause the vertebral segments to move and cause structural changes. The matters corresponding to whether the tractive force can cause structural changes could be confirmed through the results of this experiment in which the force that the thermal spinal massage device pushes from the posterior to the anterior of the spine causes changes in the height and area of the cervical and lumbar discs, and increases the Cobb's angle in the lumbar region. Second, in order for the tractive force to act effectively on the spine, the friction force may need to be minimized. Traction using the ceramic of the thermal spinal massage device conforms to the principle, because the friction other than the friction of the tissues surrounding the joint or the joint surface is minimized as the corresponding area rises. Third, the whole body of the traction target may need to be in a relaxed state (Non-Patent Document 2). Considering the fact that the thermal spinal massage device is performed in a supine position and the device used in the present example is a product approved by the Ministry of Food and Drug Safety as a device for improving muscle pain through muscle relaxation, it will sufficiently help the traction effect.

As such, it was confirmed through clinical study results that the force of pushing from the posterior to the anterior of the spine acting on the thermal spinal massage device (CGM MB-1901) has a traction effect on the intervertebral discs of the cervical and lumbar segments. Therefore, the thermal spinal massage device may be recommended as a useful medical device for the treatment of degenerative stenosis and for relieving pain in the spine.

As described above, when it is mentioned that a component is "connected to" or "joined with" another component, it may be directly connected to or joined with the other component, but it should be understood that other components may exist in the middle. On the other hand, when it is mentioned that a certain component is "directly connected to" or "directly joined with" another component, it should be understood that the other component does not exist in the middle.

The terms used herein are used only to describe specific embodiments, and are not intended to limit the present invention. The singular expression includes the plural expression unless the context clearly dictates otherwise. In the present specification, terms such as "include" or "have" are intended to designate that a feature, number, step, operation, component, part or combination thereof described in the specification exists, but it should be understood that this does not exclude in advance the presence or addition of one or more other features, numbers, steps, operations, components, parts or combinations thereof.

Terms such as first, second and the like may be used to describe various components, but the components should not be limited by the terms. The terms are used only for the purpose of distinguishing one component from another.

In addition, terms such as " . . . unit" and " . . . module" described in the specification mean a unit that processes at least one function or operation, which may be implemented as hardware or software or a combination of hardware and software.

In addition, the components of the embodiments described with reference to each drawing are not limitedly applied only to the embodiments, and may be implemented to be included in other embodiments within the scope of maintaining the technical spirit of the present invention. In addition, even if a separate description is omitted, it is natural that a plurality of embodiments may be re-implemented as a single integrated embodiment.

Further, in the description with reference to the accompanying drawings, the same components regardless of the reference numerals are assigned the same or related reference numerals, and the overlapping description thereof will be omitted. In terms of describing the present invention, if it is determined that the detailed description of a related known technology may unnecessarily obscure the gist of the present invention, the detailed description thereof will be omitted.

As described above, although the embodiments have been described with reference to the limited embodiments and drawings, various modifications and variations are possible by those skilled in the art from the above description. For example, the described techniques may be performed in a different order than the described method, and/or components of the described system, such as structure, device, circuit and the like, may be coupled or combined in a different form than the described method, or appropriate results may be achieved even if they are replaced or substituted by other components or equivalents.

Therefore, other implementations, other embodiments and equivalents to the claims are also within the scope of the following claims.

The invention claimed is:

1. A spinal traction method, which is applied to a thermal spinal massage device, the method comprising:

causing, by a spinal traction algorithm control unit of the thermal spinal massage device, a traction device to drive a ceramic to travel along a spinal column on the basis of a spinal traction algorithm in order to deliver physical force to the spine of a user, and generate force in an axial direction and a posterior-to-anterior direction to provide controlled traction, wherein the spinal traction algorithm causes the traction device of the thermal spinal massage device to generate a longitudinal tractive force as the ceramic horizontally travels while being in close contact with the spine in the axial direction along the spinal column and pulls the spine, and generate a transverse tractive force as the ceramic rises from the posterior to the anterior of the user, and wherein the spinal traction algorithm causes the traction device to drive the ceramic to adhere in the axial direction along the spinal column and travel back and forth multiple times along the axial direction according to settings, and wherein in all massage sections, there is at least one section where an intensity in a caudal-to-cranial direction is greater than an intensity in a cranial-to-caudal direction.

2. The spinal traction method of claim 1, wherein causing comprises:

inducing relaxation of the transitional joint through a plurality of reciprocating movements of the ceramic by dividing the entire spinal column into a lumbopelvic section, a thoracic section and a cervical section in order to relax the para-spinal muscles;

minimizing sciatica by relaxing the piriformis muscle while the ceramic travels multiple times across the posterior pelvis; and performing a plurality of reciprocating movements throughout the entire spinal column after ascending and descending of the ceramic to maintain intervertebral range of motion (ROM).

3. The spinal traction method of claim 2, wherein causing further comprises:

stopping the ceramic at a relevant area for relaxing the sacroiliac joint after inducing relaxation of the transitional joint to reduce sacroiliac joint displacement and relax the muscles.

4. The spinal traction method of claim 2, wherein causing further comprises:

performing curvature and positional traction of the spinal column, as the ceramic performs traction on the lumbar region and ascends and descends at a specific targeted lumbar level, after relaxing the piriformis muscle.

5. The spinal traction method of claim 2, wherein the step of performing comprises performing curvature and positional traction of the spinal column by ascending and descending the ceramic multiple times at a specific level of the cervical section for traction of the cervical spine.

6. The spinal traction method of claim 2, wherein the step of performing reciprocates the entire spinal column multiple times to ensure that the intervertebral ROM is maintained, and includes three stop intervals.

7. The spinal traction method of claim 2, wherein causing further comprises:

performing a preparatory massage of effleurage stroke for delivering a weak-intensity stimulation to the entire spinal column, before inducing relaxation of the transitional joint through the plurality of reciprocating movements.

8. The spinal traction method of claim 2, wherein causing further comprises:

attempting a final stretching of a specific section of the lumbar and cervical regions as the ceramic moves multiple times across the entire spinal column, and then inducing a reset of the para-spinal muscles through low-intensity moving, after the ceramic ascends and descends multiple times to enable curvature and positional traction of the spinal column.

9. The spinal traction method of claim 2, wherein the step of inducing comprises providing traction to widen the intervertebral space when traveling in the cranial direction through the elevation of the ceramic for each section.

10. The spinal traction method of claim 2, wherein the step of performing comprises providing traction that leads to additional intervertebral spacing when traveling in the cranial direction.

11. The spinal traction method of claim 1, wherein causing comprises alternately applying or releasing a tractive force at preset intervals by using the traction device according to the spinal traction algorithm to implement a combination of intermittent traction and positional traction that places the user in various positions to pull spinal structures longitudinally.

12. The spinal traction method of claim 1, wherein the spinal traction algorithm performs at least one of para-spinal muscle relaxation, sacroiliac joint relaxation, piriformis muscle relaxation, lumbar traction, equalization of spinal movements and cervical traction.

13. A thermal spinal massage device to which a spinal traction algorithm is applied, comprising:

a traction device;

a ceramic; and a spinal traction algorithm control unit configured to cause the traction device to drive the ceramic to travel along the spinal column of a user on the basis of the spinal traction algorithm to deliver physical force to the spine of the user and generate force in an axial direction and a posterior-to-anterior direction to provide controlled traction, wherein the spinal traction algorithm control unit is further configured to cause the traction device to generate a longitudinal tractive force as the ceramic adheres in the axial direction along the spinal column and travels horizontally and performs traction on the spine, and generate a transverse tractive force as the ceramic acts upward from the posterior to the anterior, wherein the spinal traction algorithm control unit is further configured to cause the traction device to drive the ceramic to adhere in the axial direction along the spinal column and travel back and forth multiple times according to settings, and wherein in all massage sections, there is at least one section where an intensity in a caudal-to-cranial direction is greater than an intensity in a cranial-to-caudal direction.

14. The thermal spinal massage device of claim 13, wherein the spinal traction algorithm control unit is further configured to:

induce relaxation of the transitional joint through a plurality of reciprocating movements of the ceramic, by dividing the entire spinal column into a lumbopelvic section, a thoracic section and a cervical section in order to relax the para-spinal muscles;

minimize sciatica by relaxing the piriformis muscle while the ceramic travels multiple times across the posterior pelvis; and perform a plurality of reciprocating movements throughout the entire spinal column after ascending and descending of the ceramic to maintain intervertebral ROM.

15. The thermal spinal massage device of claim 14, wherein the spinal traction algorithm control unit is further configured to:

stop the ceramic at the relevant area for relaxing the sacroiliac joint to reduce sacroiliac joint displacement and relax the muscles.

16. The thermal spinal massage device of claim 14, wherein the spinal traction algorithm control unit is further configured to:

perform curvature and positional traction of the spinal column, in response to the ceramic performing traction on the lumbar region and ascending and descending at a specific targeted lumbar level.

17. The thermal spinal massage device of claim 14, wherein the spinal traction algorithm control unit is further configured to:

cause curvature and positional traction of the spinal column by ascending and descending the ceramic multiple times at a specific level of the cervical section for traction of the cervical spine.

* * * * *